United States Patent
Park et al.

(10) Patent No.: US 11,491,742 B2
(45) Date of Patent: Nov. 8, 2022

(54) ARAMID FABRIC HAVING EXCELLENT ADHESION TO POLYURETHANE MATRIX RESIN AND EXCELLENT TENSILE STRENGTH, METHOD FOR PRODUCING SAME, ARAMID FABRIC PREPREG COMPRISING SAME AND ARAMID FABRIC/THERMOPLASTIC POLYURETHANE MATRIX RESIN COMPOSITE COMPRISING SAME

(71) Applicant: KOLON INDUSTRIES, INC., Seoul (KR)

(72) Inventors: Hyun Jung Park, Seoul (KR); Ji Eun Yang, Seoul (KR); Sang Jun Yoon, Seoul (KR)

(*) Notice: Subject to any disclaimer, the term of this patent is extended or adjusted under 35 U.S.C. 154(b) by 344 days.

(21) Appl. No.: 16/640,473

(22) PCT Filed: Sep. 20, 2018

(86) PCT No.: PCT/KR2018/011106
§ 371 (c)(1),
(2) Date: Feb. 20, 2020

(87) PCT Pub. No.: WO2019/066374
PCT Pub. Date: Apr. 4, 2019

(65) Prior Publication Data
US 2020/0216628 A1    Jul. 9, 2020

(30) Foreign Application Priority Data

Sep. 28, 2017 (KR) .................. 10-2017-0126197
Dec. 5, 2017 (KR) .................. 10-2017-0165779

(51) Int. Cl.
B29C 70/22 (2006.01)
B29B 15/12 (2006.01)
(Continued)

(52) U.S. Cl.
CPC .............. B29C 70/22 (2013.01); B29B 15/12 (2013.01); B29C 70/34 (2013.01); C08J 5/248 (2021.05);
(Continued)

(58) Field of Classification Search
CPC . B29C 66/7212; B29C 66/731; B29C 66/723; B29K 2277/10; Y10T 428/24;
(Continued)

(56) References Cited

U.S. PATENT DOCUMENTS 4,186,648 A * 2/1980 Clausen ................ F41H 5/0435
                                              109/81
4,613,535 A    9/1986 Harpell
(Continued)

FOREIGN PATENT DOCUMENTS

CN    103476844 A    12/2013
CN    106836199 A    6/2017
(Continued)

OTHER PUBLICATIONS

European Search Report dated Mar. 15, 2021.
International Search Report for PCT/KR2018/011106 dated Feb. 28, 2019 [PCT/ISA/210].

*Primary Examiner* — Camie S Thompson
(74) *Attorney, Agent, or Firm* — Harvest IP Law, LLP

(57) ABSTRACT

An aramid fabric having excellent adhesion to a polyurethane matrix resin and excellent tensile strength is produced by the method including the steps of: (i) weaving a basket-structured aramid fabric by using aramid yarns as warp and weft yarns; and then (ii) dipping the woven aramid fabric in a sizing agent solution consisting of an aqueous polyurethane resin as a sizing agent and water, followed by squeezing and drying. In the present disclosure, the sizing agent is applied to the woven aramid fabric, thereby effectively preventing the deterioration in weaving efficiency. Further, (Continued)

the aramid fabric is woven in a basket weave, and thus the compactness of the aramid fabric is lowered and the wetting property of the aramid fabric with the polyurethane matrix resin is improved.

16 Claims, 1 Drawing Sheet

(51) Int. Cl.
| | |
|---|---|
| *B29C 70/34* | (2006.01) |
| *D06B 3/18* | (2006.01) |
| *D06M 15/564* | (2006.01) |
| *D03D 15/283* | (2021.01) |
| *C08J 5/24* | (2006.01) |
| *B29K 75/00* | (2006.01) |
| *B29K 277/00* | (2006.01) |
| *D06M 101/36* | (2006.01) |

(52) U.S. Cl.
CPC ............ *D03D 15/283* (2021.01); *D06B 3/18* (2013.01); *D06M 15/564* (2013.01); *B29K 2075/00* (2013.01); *B29K 2277/10* (2013.01); *C08J 2377/00* (2013.01); *C08J 2475/04* (2013.01); *D06M 2101/36* (2013.01)

(58) Field of Classification Search
CPC . Y10T 248/24033; F41H 5/0485; F41H 1/02; Y10S 428/911; Y10S 442/2902; Y10S 442/2623; B60R 2021/23514; D06N 3/0034; D10B 2331/02; B32B 5/024; B32B 5/28; B32B 2262/0269; B32B 2571/02; B32B 2260/046

USPC ........ 442/169, 149, 135; 428/102, 113, 378, 428/395, 911; 57/251, 242, 7; 427/412; 2/2.5; 8/115.52

See application file for complete search history.

(56) References Cited

U.S. PATENT DOCUMENTS

| | | | |
|---|---|---|---|
| 9,885,128 | B2 | 2/2018 | Oliver et al. |
| 2006/0084336 | A1 | 4/2006 | Howland |
| 2007/0194490 | A1 | 8/2007 | Bhatnagar et al. |
| 2013/0212763 | A1 | 8/2013 | Bhatnagar et al. |
| 2014/0256855 | A1 | 9/2014 | Wakabayashi et al. |
| 2014/0272267 | A1* | 9/2014 | Grunden ............... F41H 5/0485 |
| | | | 428/113 |
| 2015/0040749 | A1 | 2/2015 | Bhatnagar et al. |
| 2017/0027268 | A1 | 2/2017 | Folgar |
| 2017/0292210 | A1 | 10/2017 | Iwashita |
| 2020/0165753 | A1* | 5/2020 | Yang ................... D03D 15/283 |

FOREIGN PATENT DOCUMENTS

| | | |
|---|---|---|
| JP | S59059439 A | 4/1984 |
| JP | S62110984 A | 5/1987 |
| JP | S62128750 A | 6/1987 |
| JP | H0770868 A | 3/1995 |
| JP | 7-232792 A | 9/1995 |
| JP | H10168760 A | 6/1998 |
| JP | 2000199208 A | 7/2000 |
| JP | 2015101793 A | 6/2015 |
| KR | 10-2007-0037832 A | 4/2007 |
| KR | 10-2008-0093149 A | 10/2008 |
| KR | 10-2014-0012759 A | 2/2014 |
| KR | 10-1453293 B1 | 10/2014 |
| KR | 10-2016-0112171 A | 9/2016 |
| KR | 10-2017-0073044 A | 6/2017 |
| RU | 2016003 C1 | 7/1994 |
| WO | 2013/100212 A1 | 7/2013 |

* cited by examiner

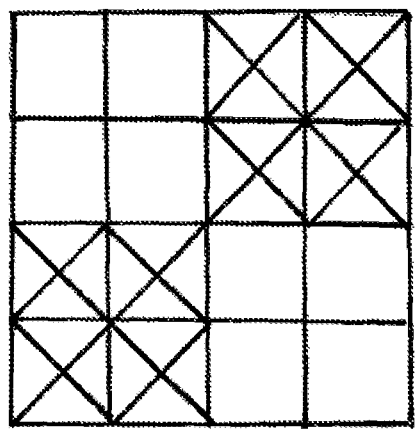

ARAMID FABRIC HAVING EXCELLENT ADHESION TO POLYURETHANE MATRIX RESIN AND EXCELLENT TENSILE STRENGTH, METHOD FOR PRODUCING SAME, ARAMID FABRIC PREPREG COMPRISING SAME AND ARAMID FABRIC/THERMOPLASTIC POLYURETHANE MATRIX RESIN COMPOSITE COMPRISING SAME

CROSS REFERENCE TO RELATED APPLICATIONS

This application is a National Stage of International Application No. PCT/KR2018/011106 filed Sep. 20, 2018, claiming priority based on Korean Patent Application Nos. 10-2017-0126197 filed Sep. 28, 2017 and 10-2017-0165779 filed Dec. 5, 2017.

TECHNICAL FIELD

The present disclosure relates to an aramid fabric having excellent adhesion to a polyurethane matrix resin and excellent tensile strength, a method for producing the same, an aramid fabric prepreg including the same, and an aramid fabric/thermoplastic polyurethane resin composite including the same, and more particularly, to an aramid fabric which can increase the cohesion of aramid yarns constituting the aramid fabric and thus enhance the tensile strength of the aramid fabric, can improve weaving performance without causing the a dropping phenomenon of size during weaving, and can enhance the adhesion to a polyurethane matrix resin, and to a method for producing the same.

The present disclosure also relates to an aramid fabric prepreg in which the aramid fabric is impregnated with a polyurethane matrix resin in an uncured or semi-cured state.

The present disclosure further relates to a composite composed of an aramid fabric/thermoplastic polyurethane matrix resin that is excellent in impact resistance, tensile strength, and tensile elastic modulus by including the aramid fabric.

BACKGROUND ART

As electronic part materials or automotive part materials, a reinforcing fiber material/resin composite (hereinafter referred to as "composite") in which a polyurethane matrix resin is impregnated and cured in a reinforcing fiber material have been widely used.

Glass fiber has been used as the reinforcing fiber material, but the glass fiber has a high specific gravity, which makes it difficult to reduce weight, and there is a problem that it is harmful to the human body.

In another conventional technique, in order to solve such a problem, carbon fiber has been used instead of glass fiber as the reinforcing fiber material, but the carbon fiber has a problem that non-rigidity is large, and thus processability and impact resistance are reduced.

As yet another conventional technique, an aramid fabric woven with a plain weave has been mainly used as a reinforcing fiber material, but the aramid fabric woven with the plain weave has poor wetting properties with polyurethane matrix resins, and aramid yarns constituting the conventional aramid fabric have a problem that the compatibility with the polyurethane matrix resin is reduced, which results in a decrease in adhesion between the aramid fabric and the polyurethane matrix resin, and further, there was a problem that the cohesion between the yarns constituting the aramid fabric is insufficient and thus the tensile strength of the aramid fabric is reduced.

DETAILED DESCRIPTION OF THE PRESENT DISCLOSURE

Technical Problem

It is an object of the present disclosure to provide a method for producing an aramid fabric which has an excellent wetting property with the polyurethane matrix resin impregnated into the aramid fabric, resulting in excellent adhesion between the aramid fabric and the polyurethane matrix resin, and at the same time increasing the cohesion of yarns in the aramid fabric and exhibiting excellent tensile strength of the aramid fabric, and thus is useful as a fiber-reinforced composite material.

It is another object of the present disclosure to provide an aramid fabric which is produced by the above method and which has excellent adhesion to a polyurethane matrix resin and excellent tensile strength, and an aramid fabric prepreg including the same.

It is still another object of the present disclosure to provide an aramid fabric/thermoplastic polyurethane matrix resin composite which is excellent in tensile strength and tensile elastic modulus and is also particularly excellent in impact resistance, and thus is useful as automotive part materials requiring excellent impact resistance.

Technical Solution

In order to achieve the above objects, in one aspect of the present disclosure, an aramid fabric having excellent adhesion to a polyurethane matrix resin and excellent tensile strength is produced by a method including the steps of: (i) weaving a basket weave aramid fabric by using aramid yarns as warp and weft yarns; and (ii) dipping the woven aramid fabric in a sizing agent solution composed of an aqueous polyurethane resin as a sizing agent and water, followed by squeezing and drying, thereby attaching and impregnating the sizing agent solution onto the aramid fabric, wherein the content of the aqueous polyurethane resin attached to and impregnated into the surface and the inside of the aramid fabric is adjusted to 1 to 8% by weight, based on the sum total of the weight of the aqueous polyurethane resin attached to and impregnated into the surface and the inside of the aramid fabric and the weight of the aramid fabric before the aqueous polyurethane resin is attached and impregnated.

In another aspect of the present disclosure, an aramid fabric/thermoplastic polyurethane matrix resin composite is produced by using two or more basket weave aramid fabrics in which an aqueous polyurethane resin is attached/impregnated onto the surface and inside as a reinforcing fiber material constituting an aramid fabric/thermoplastic polyurethane resin composite, and using a thermoplastic polyurethane resin as the matrix resin constituting the composite.

Advantageous Effects

In the present disclosure, since the sizing agent is applied to the woven aramid fabric, it is possible to effectively prevent deterioration in weaving efficiency due to the dropping of size agents during weaving, compared with a method in which a sizing agent is applied to an aramid yarn before weaving.

Additionally, in the present disclosure, since an aqueous polyurethane resin is attached to or impregnated into a surface and the inside of the aramid fabric, the adhesion of the aramid fabric to a polyurethane matrix resin is improved and the cohesion of aramid yarns in the aramid fabric is increased, so that the tensile strength of the aramid fabric is enhanced.

Furthermore, in the present disclosure, since the aramid fabric is woven in a basket weave, compactness of the aramid fabric is lowered and the wetting property of the aramid fabric with the polyurethane matrix resin is improved, and as a result, the adhesion between the aramid fabric and the polyurethane matrix resin is enhanced.

Consequently, the aramid fabric produced according to the present disclosure is useful as a reinforcing fiber material for the production of reinforcing fiber materials/resin composites used in electronic part materials and the like.

Further, since the aramid fabric/thermoplastic polyurethane resin composite of the present disclosure is an aramid fabric whose reinforcing fiber material is excellent in impact resistance, it is useful as an automobile part material such as an automobile bumper or an electronic part material which requires impact resistance.

BRIEF DESCRIPTION OF THE DRAWING

FIG. 1 is a structural diagram of an example of an aramid fabric according to the present disclosure.

DETAILED DESCRIPTION OF THE EMBODIMENTS

Hereinafter, the present disclosure will be described in detail with reference to the accompanying FIGURE.

A method for producing an aramid fabric having excellent adhesion to a polyurethane matrix resin and excellent tensile strength according to the present disclosure includes (i) a weaving step of weaving a basket weave aramid fabric by using aramid yarns as warp and weft yarns, and (ii) a sizing treatment step of dipping the woven aramid fabric in a sizing agent solution composed of an aqueous polyurethane resin as a sizing agent and water, followed by squeezing and drying, thereby attaching and impregnating the sizing agent solution to the aramid fabric, wherein the content of the aqueous polyurethane resin attached to and impregnated into the surface and the inside of the aramid fabric is adjusted to 1 to 8% by weight, based on the sum total of the weight of the aqueous polyurethane resin attached to and impregnated into the surface and the inside of the aramid fabric and the weight of the aramid fabric before the aqueous polyurethane resin is attached and impregnated.

Specifically, according to the present disclosure, an aramid fabric having excellent adhesion to a polyurethane matrix resin and excellent tensile strength is produced by (i) weaving a basket weave aramid fabric by using aramid yarns as warp and weft yarns, and then (ii) dipping the woven aramid fabric in a sizing agent solution composed of an aqueous polyurethane resin as a sizing agent and water, followed by squeezing and drying.

At this time, the basket texture is a 2×2 basket weave, as shown in FIG. 1, which is preferable in the view of reducing the compactness of the aramid fabric and improving the wetting property with the polyurethane matrix resin.

In the present disclosure, the content of the aqueous polyurethane resin attached to and impregnated into the surface and the inside of the aramid fabric is adjusted to 1 to 8% by weight, preferably 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated, thereby improving the cohesion of yarns in the aramid fabric and also improving the adhesion between the aramid fabric and the polyurethane matrix resin.

The weight ratio of the aqueous polyurethane resin and water, which are a sizing agent constituting the sizing agent solution, is preferably 1.8 to 2.2:1, which is preferable in the view of imparting the sizing agent and improving the processability.

When squeezing the aramid fabric dip-treated in the sizing agent solution, it is preferable that a pressure of 1 to 2 $kgf/cm^2$ is applied using a mangle, etc., and then the squeezed aramid fabric is dried at a temperature of 110 to 130° C. for 3 to 5 minutes.

The aramid fabric of the present disclosure has specific features that warp and weft yarns, which are aramid yarns, are woven in a basket weave, the aqueous polyurethane resin is attached to and impregnated into the surface and the inside of the aramid fabric, and the content of the aqueous polyurethane resin attached to and impregnated into the surface and the inside of the aramid fabric is 1 to 8% by weight, based on the sum total of the weight of the aqueous polyurethane resin attached to and impregnated into the surface and the inside of the aramid fabric and the weight of the aramid fabric before the aqueous polyurethane resin is attached and impregnated.

At this time, the basket texture is a 2×2 basket weave, as shown in FIG. 1, which is preferable in the view of reducing the compactness of the aramid fabric and improve the wetting property with the polyurethane matrix resin.

In addition, the aramid yarn constituting the aramid fabric has fineness of 1000 to 3000 denier, and the warp density and the weft density are 10 to 20 yarns/inch, which are preferable in the view of improving the tensile strength of the aramid fabric.

The aramid fabric has excellent tensile strength of 19,000 to 21,000 N/5 cm as measured by the method of ASTM D 3039.

The aramid fabric prepreg of the present disclosure includes (i) an aramid fabric which has a texture where warp and weft yarns, which are aramid yarns, are woven in a basket weave, and in which an aqueous polyurethane resin is attached to and impregnated into the surface and inside of the fabric, and (ii) a polyurethane matrix resin which is impregnated in the aramid fabric and is in an uncured or semi-cured state, wherein the content of the aqueous polyurethane resin attached to and impregnated into the surface and the inside of the aramid fabric is 1 to 8% by weight, preferably 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated.

The content of the aqueous polyurethane resin attached to and impregnated into the surface and the inside of the aramid fabric is 1 to 8% by weight, preferably 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated, which is preferable in the view of increasing the cohesion of yarns in the aramid fabric and improving the adhesion between the aramid fabric and the polyurethane matrix resin.

According to the present disclosure, since the sizing agent is applied to the woven aramid fabric, it is possible to effectively prevent the deterioration in weaving efficiency due to the dropping of size agents during weaving, compared with a method in which a sizing agent is applied to an aramid yarn before weaving.

Additionally, in the present disclosure, since an aqueous polyurethane resin is attached to or impregnated into a surface and the inside of the aramid fabric, the adhesion of the aramid fabric to a polyurethane matrix resin is improved and the cohesion of aramid yarns in the aramid fabric is increased, so that the tensile strength of the aramid fabric is enhanced.

Further, in the present disclosure, since the aramid fabric is woven in a basket weave, the compactness of the aramid fabric is lowered and the wetting property of the aramid fabric with the polyurethane matrix resin is improved, and as a result, the adhesion between the aramid fabric and the polyurethane matrix resin is enhanced.

Consequently, the aramid fabric produced according to the present disclosure is useful as a reinforcing fiber material for the production of reinforcing fiber materials/resin composites used in electronic part materials and the like.

The aramid fabric/thermoplastic polyurethane resin composite of the present disclosure includes: (i) two or more aramid fabrics which have a texture where warp and weft yarns, which are aramid yarns, are woven in a basket weave, and in which an aqueous polyurethane resin is attached to and impregnated into the surface and inside of the fabric; and (ii) a polyurethane matrix resin which is impregnated within the aramid fabric and between the aramid fabrics, wherein the content of the aqueous polyurethane resin attached to and impregnated into the surface and the inside of the aramid fabric is 1 to 8% by weight based on the sum total of the weight of the aqueous polyurethane resin attached to and impregnated into the surface and the inside of the aramid fabric and the weight of the aramid fabric before the aqueous polyurethane resin is attached and impregnated, and wherein a peak force measured by the method ISO-6603 is 18,000 N or more.

In addition, the composite of the present disclosure has tensile strength of 600 MPa or more and a tensile elastic modulus of 25 GPa or more as measured by the method of ASTM D 3039, and thus has excellent tensile strength and tensile elastic modulus.

In one embodiment of the present disclosure, when the composite has a thickness of 2.0 to 2.2 mm and the content of the thermoplastic polyurethane matrix resin is 30 to 45% by weight, (i) a peak force is about 18,845 N which is excellent in impact resistance, (ii) the tensile strength measured by the method of ASTM D 3039 is about 635 MPa, and (iii) the tensile elastic modulus measured by the method of ASTM D 3039 is about 31 GPa, which is excellent in tensile strength and tensile elastic modulus and also particularly excellent in impact resistance.

The basket texture is a 2×2 basket weave as shown in FIG. 1, which is preferable in the view of reducing the compactness of the aramid fabric and improving the wetting property with the polyurethane matrix resin.

In addition, the aramid yarn constituting the aramid fabric has fineness of 1000 to 3000 denier, and the warp density and the weft density is 10 to 20 yarns/inch, which is preferable in the view of improving the tensile strength of the aramid fabric.

The content of the aqueous polyurethane resin attached to and impregnated into the surface and the inside of the aramid fabric is 1 to 8% by weight, preferably 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated, which is preferable in the view of improving the cohesion of yarns in the aramid fabric and also improving the adhesion between the aramid fabric and the polyurethane matrix resin.

Next, an example of a method for producing the composite of the present disclosure will be described.

The method for producing an aramid fabric/thermoplastic polyurethane composite according to the present disclosure includes: (i) a step of weaving a basket weave aramid fabric by using aramid yarns as warp and weft yarns; (ii) a sizing treatment step of dipping the woven aramid fabric in a sizing agent solution composed of an aqueous polyurethane resin as a sizing agent and water, followed by squeezing and drying, thereby attaching and impregnating the sizing agent solution to the aramid fabric, wherein the content of the aqueous polyurethane resin attached to and impregnated into the surface and the inside of the aramid fabric is adjusted to 1 to 8% by weight, based on the sum total of the weight of the aqueous polyurethane resin attached to and impregnated into the surface and the inside of the aramid fabric and the weight of the aramid fabric before the aqueous polyurethane resin is attached and impregnated; (iii) a step of impregnating the thermoplastic polyurethane matrix resin into the aramid fabric to which the sizing agent is attached and impregnated to produce an aramid fabric prepreg; and (iv) a step of laminating two or more aramid fabric prepregs, and then heating and pressing them to prepare the aramid fabric/thermoplastic polyurethane resin composite.

Specifically, in the present disclosure, a basket weave aramid fabric is first woven by using aramid yarns as warp and weft yarns.

At this time, the basket texture is a 2×2 basket weave, as shown in FIG. 1, which is preferable in the view of reducing the compactness of the aramid fabric and improving the wetting property with the polyurethane matrix resin.

The aramid yarn has fineness of 1000 to 7000 denier, preferably 1000 to 4000 denier, and the warp density and the weft density of the aramid fabric are 10 to 20 yarns/inch, which are preferable in the view of improving the tensile strength or the like of the aramid fabric.

Next, the woven aramid fabric is dipped in a sizing agent solution composed of an aqueous polyurethane resin as a sizing agent and water, followed by squeezing and drying, thereby attaching and impregnating the sizing agent solution to the aramid fabric.

At this time, the content of the aqueous polyurethane resin attached to and impregnated into the surface and the inside of the aramid fabric is 1 to 8% by weight, preferably 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated, which is preferable in the view of improving the cohesion of yarns in the aramid fabric and also improving the adhesion between the aramid fabric and the polyurethane matrix resin.

The weight ratio of the aqueous polyurethane resin to water, which is a sizing agent constituting the sizing agent solution, is preferably 1.8 to 2.2:1, which is preferable in the view of imparting the sizing agent and improving the processability.

When squeezing the aramid fabric dip-treated in the sizing agent solution, a pressure of 1 to 2 kgf/cm$^2$ is preferably applied using a mangle, etc., and then the squeezed aramid fabric is dried at a temperature of 110 to 130° C. for 3 to 5 minutes.

Next, the aramid fabric prepreg is produced by impregnating the thermoplastic polyurethane matrix resin into the aramid fabric to which the sizing agent is attached and impregnated.

At this time, since the thermoplastic polyurethane resin is used instead of the thermosetting polyurethane resin as the matrix resin, the tensile strength, tensile elastic modulus, and impact resistance of the composite can be greatly improved.

Next, two or more aramid fabric prepregs are laminated, then heated and pressed to produce an aramid fabric/thermoplastic polyurethane resin composite.

At this time, the number of laminated aramid prepregs is 2 to 8, which is preferable in the view of improving the lightness and impact resistance, but the number of laminated aramid prepregs can be adjusted according to the use of the composite.

Since the present disclosure uses an aramid fabric having excellent impact resistance as a reinforcing fiber material, the impact resistance of the composite is further improved.

In addition, in the present disclosure, since an aqueous polyurethane resin as a sizing agent is attached to or impregnated into a surface and the inside of the aramid fabric, the adhesion to a thermoplastic polyurethane matrix resin is improved and the cohesion of aramid yarns in the aramid fabric is increased, so that the tensile strength and tensile elastic modulus of the aramid fabric are enhanced.

Further, in the present disclosure, since the aramid fabric is woven in a basket weave, the compactness of the aramid fabric is lowered and the wetting property of the aramid fabric with the polyurethane matrix resin is improved, and as a result, the adhesion between the aramid fabric and the polyurethane matrix resin is enhanced.

Consequently, the aramid fabric/thermoplastic polyurethane resin composite of the present disclosure is useful as an automobile part material such as an automobile bumper, or an electronic part material, which requires impact resistance.

Hereinafter, the present disclosure will be described in more detail with reference to examples and comparative examples.

The following examples are preferred embodiments of the present disclosure and the scope of the present disclosure is not limited only to these examples.

Example 1

A 2×2 basket weave aramid fabric was woven using 3000 denier aramid yarns as warp and weft yarns.

At this time, the warp density and the weft density were set to 17 yarns/inch, respectively.

Next, the aramid fabric woven as above was dipped in a sizing agent solution consisting of 100 parts by weight of an aqueous polyurethane resin (sizing agent) and 50 parts by weight of water, then pressed at a pressure of 1.5 kgf/cm² using a mangle, and dried at 120° C. for 4 minutes to prepare a sizing agent-treated aramid fabric.

At this time, the content of the aqueous polyurethane resin attached to and impregnated into the surface and the inside of the aramid fabric was adjusted to 3 wt % based on the sum total of the weight of the aqueous polyurethane resin attached to and impregnated into the surface and the inside of the aramid fabric and the weight of the aramid fabric before the aqueous polyurethane resin was attached and impregnated.

Next, after the sizing agent-treated aramid fabric as described above was impregnated with 35 wt % of a polyurethane resin (matrix resin) to prepare aramid fabric prepregs, five aramid fabric prepregs were laminated, and then molded with heating/pressing to produce a reinforcing fiber material/resin composite.

The tensile strength of the produced aramid fabric and the elastic modulus of the reinforcing fiber material/resin composite were measured and the results are shown in Table 1 below.

Comparative Example 1

A plain weave aramid fabric was woven using 3000 denier aramid yarns as warp and weft yarns.

At this time, the warp density and the weft density were set to 17 yarns/inch, respectively.

Next, the aramid fabric woven as above was dipped in a sizing agent solution consisting of 100 parts by weight of an aqueous polyurethane resin (sizing agent) and 50 parts by weight of water, then pressed at a pressure of 1.5 kgf/cm² using a mangle, and dried at 120° C. for 4 minutes to prepare a sizing agent-treated aramid fabric.

At this time, the content of the aqueous polyurethane resin attached to and impregnated into the surface and the inside of the aramid fabric was adjusted to 3 wt % based on the sum total of the weight of the aqueous polyurethane resin attached to and impregnated into the surface and the inside of the aramid fabric and the weight of the aramid fabric before the aqueous polyurethane resin was attached and impregnated.

Next, after the sizing agent-treated aramid fabric as described above was impregnated with 35 wt % of a polyurethane resin (matrix resin) to prepare aramid fabric prepregs, five aramid fabric prepregs were laminated, and then molded with heating/pressing to produce a reinforcing fiber material/resin composite.

The tensile strength of the produced aramid fabric and the elastic modulus of the reinforcing fiber material/resin composite were measured and the results are shown in Table 1 below.

Comparative Example 2

A twill weave aramid fabric was woven using 3000 denier aramid yarns as warp and weft yarns.

At this time, the warp density and the weft density were set to 17 yarns/inch, respectively.

Next, the aramid fabric woven as above was dipped in a sizing agent solution consisting of 100 parts by weight of an aqueous polyurethane resin (sizing agent) and 50 parts by weight of water, then pressed at a pressure of 1.5 kgf/cm² using a mangle, and dried at 120° C. for 4 minutes to prepare a sizing agent-treated aramid fabric.

At this time, the content of the aqueous polyurethane resin attached to and impregnated into the surface and the inside of the aramid fabric was adjusted to 3 wt % based on the sum total of the weight of the aqueous polyurethane resin attached to and impregnated into the surface and the inside of the aramid fabric and the weight of the aramid fabric before the aqueous polyurethane resin was attached and impregnated.

Next, after the sizing agent-treated aramid fabric as described above was impregnated with 35 wt % of a polyurethane resin (matrix resin) to prepare aramid fabric prepregs, five aramid fabric prepregs were laminated, and then molded with heating/pressing to produce a reinforcing fiber material/resin composite.

The tensile strength of the produced aramid fabric and the elastic modulus of the reinforcing fiber material/resin composite were measured and the results are shown in Table 1 below.

Comparative Example 3

A 2×2 basket weave aramid fabric was woven using 3000 denier aramid yarns as warp and weft yarns.

At this time, the warp density and the weft density were set to 17 yarns/inch, respectively.

Next, the aramid fabric woven as above (not treated with a sizing agent) was impregnated with 35 parts by weight of a polyurethane resin (matrix resin) to prepare aramid fabric prepregs, then five aramid fabric prepregs were laminated, and then molded with heating/pressing to produce a reinforcing fiber material/resin composite.

The tensile strength of the produced aramid fabric and the elastic modulus of the reinforcing fiber material/resin composite were measured and the results are shown in Table 1 below.

TABLE 1

| Category | Tensile strength of aramid fabric (N/5 cm) | Elastic modulus of composite (MPa) |
| --- | --- | --- |
| Example 1 | 19,900 | 21.5 |
| Comparative Example 1 | 17,600 | 6.6 |
| Comparative Example 2 | 18,800 | 7.5 |
| Comparative Example 3 | 17,000 | 10.0 |

The tensile strength of the aramid fabrics and the elastic modulus of the reinforcing fiber material/resin composites described in Table 1 were measured by the method of ASTM D 3039.

The aramid fabric prepared in Example 1 was excellent in tensile strength, but the aramid fabrics prepared in Comparative Examples 1 to 3 were relatively poor in tensile strength as compared with Example 1.

In addition, the composite prepared in Example 1 was excellent in elastic modulus, but the composites prepared in Comparative Examples 1 to 3 were relatively poor in elastic modulus as compared with Example 1.

Example 2

A 2×2 basket weave aramid fabric was woven using 3000 denier aramid yarns as warp and weft yarns.

At this time, the warp density and the weft density were set to 17 yarns/inch, respectively.

Next, the aramid fabric woven as above was dipped in a sizing agent solution consisting of 100 parts by weight of an aqueous polyurethane resin (sizing agent) and 50 parts by weight of water, then pressed at a pressure of 1.5 kgf/cm$^2$ using a mangle, and dried at 120° C. for 4 minutes to prepare a sizing agent-treated aramid fabric.

At this time, the content of the aqueous polyurethane resin attached to and impregnated into the surface and the inside of the aramid fabric was adjusted to 3 wt % based on the sum total of the weight of the aqueous polyurethane resin attached to and impregnated into the surface and the inside of the aramid fabric and the weight of the aramid fabric before the aqueous polyurethane resin was attached and impregnated.

Next, after the sizing agent-treated aramid fabric as described above was impregnated with 35 wt % of a polyurethane resin (matrix resin) to prepare aramid fabric prepregs, four aramid fabric prepregs were laminated, and then molded with heating/pressing to produce a reinforcing fiber material/resin composite with a thickness of 2.1 mm.

The tensile strength, tensile elastic modulus and peak force of the produced aramid fabric/thermoplastic polyurethane resin composite were measured and the results are shown in Table 2 below.

Comparative Example 4

A 1×1 plain weave aramid fabric was woven using 3000 denier aramid yarns as warp and weft yarns.

At this time, the warp density and the weft density were set to 17 yarns/inch, respectively.

Next, the aramid fabric woven as above was dipped in a sizing agent solution consisting of 100 parts by weight of an aqueous polyurethane resin (sizing agent) and 50 parts by weight of water, then pressed at a pressure of 1.5 kgf/cm$^2$ using a mangle, and dried at 120° C. for 4 minutes to prepare a sizing agent-treated aramid fabric.

At this time, the content of the aqueous polyurethane resin attached to and impregnated into the surface and the inside of the aramid fabric was adjusted to 3 wt % based on the sum total of the weight of the aqueous polyurethane resin attached to and impregnated into the surface and the inside of the aramid fabric and the weight of the aramid fabric before the aqueous polyurethane resin was attached and impregnated.

Next, after the sizing agent-treated aramid fabric as described above was impregnated with 35 wt % of a polyurethane resin (matrix resin) to prepare aramid fabric prepregs, four aramid fabric prepregs were laminated, and then molded with heating/pressing to produce a reinforcing fiber material/resin composite with a thickness of 2.1 mm.

The tensile strength, tensile elastic modulus and peak force of the produced aramid fabric/thermoplastic polyurethane resin composite were measured and the results are shown in Table 2 below.

Comparative Example 5

A twill weave carbon fiber fabric was woven using 3000 denier aramid yarns as warp and weft yarns.

At this time, the warp density and the weft density were set to 17 yarns/inch, respectively.

Next, the carbon fiber fabric woven as above was dipped in a sizing agent solution consisting of 100 parts by weight of an aqueous polyurethane resin (sizing agent) and 50 parts by weight of water, then pressed at a pressure of 1.5 kgf/cm$^2$ using a mangle, and dried at 120° C. for 4 minutes to prepare a sizing agent-treated aramid fabric.

At this time, the content of the aqueous polyurethane resin attached to and impregnated into the surface and the inside of the carbon fiber fabric was adjusted to 3 wt % based on the sum total of the weight of the aqueous polyurethane resin attached to and impregnated into the surface and the inside of the aramid fabric and the weight of the carbon fiber fabric before the aqueous polyurethane resin was attached and impregnated.

Next, after the sizing agent-treated carbon fiber fabric as described above was impregnated with 35 wt % of a polyurethane resin (matrix resin) to prepare carbon fiber fabric prepregs, four carbon fiber fabric prepregs were laminated, and then molded with heating/pressing to produce a reinforcing fiber material/resin composite with a thickness of 2.1 mm.

The tensile strength, tensile elastic modulus, and peak force of the produced aramid fabric/thermoplastic polyurethane resin composite were measured and the results are shown in Table 2 below.

Comparative Example 6

A twill weave aramid fabric was woven using 3000 denier aramid yarns as warp and weft yarns.

At this time, the warp density and the weft density were set to 17 yarns/inch, respectively.

Next, the carbon fiber fabric woven as above was dipped in a sizing agent solution consisting of 100 parts by weight of an aqueous polyurethane resin (sizing agent) and 50 parts by weight of water, then pressed at a pressure of 1.5 kgf/cm$^2$ using a mangle, and dried at 120° C. for 4 minutes to prepare a sizing agent-treated aramid fabric.

At this time, the content of the aqueous polyurethane resin attached to and impregnated into the surface and the inside of the carbon fiber fabric was adjusted to 3 wt % based on the sum total of the weight of the aqueous polyurethane resin attached to and impregnated into the surface and the inside of the aramid fabric and the weight of the carbon fiber fabric before the aqueous polyurethane resin was attached and impregnated.

Next, after the sizing agent-treated carbon fiber fabric as described above was impregnated with 35 wt % of a polyurethane resin (matrix resin) to prepare carbon fiber fabric prepregs, nine carbon fiber fabric prepregs were laminated, and then molded with heating/pressing to produce a reinforcing fiber material/resin composite with a thickness of 2.0 mm.

The tensile strength, tensile elastic modulus, and peak force of the produced carbon fiber fabric/thermoplastic polyurethane resin composite were measured and the results are shown in Table 2 below.

Comparative Example 7

A 2×2 basket weave aramid fabric was woven using 3000 denier aramid yarns as warp and weft yarns.

At this time, the warp density and the weft density were set to 17 yarns/inch, respectively.

Next, the aramid fabric woven as above (not treated with a sizing agent) was impregnated with 35 parts by weight of a polyurethane resin (matrix resin) to prepare aramid fabric prepregs, then four aramid fabric prepregs were laminated, and then molded with heating/pressing to produce an aramid fabric/thermoplastic polyurethane resin composite with a thickness of 2.1 mm.

The tensile strength, tensile elastic modulus, and peak force of the produced aramid fabric/thermoplastic polyurethane resin composite were measured and the results are shown in Table 2 below.

TABLE 2

| Physical properties of composite | | | |
|---|---|---|---|
| Category | Tensile strength (MPa) | Tensile elastic modulus (GPa) | Peak force (N) |
| Example 2 | 612 | 20.7 | 1884 |
| Comparative Example 4 | 483 | 7.2 | 18,470 |
| Comparative Example 5 | 900 | 46.8 | 7439 |
| Comparative Example 6 | 1000 | 60.0 | 2440 |
| Comparative Example 7 | 323 | 7.0 | 1840 |

The tensile strength and tensile elastic modulus were measured by the method of ASTM D 3039, and the peak force was measured by the method of ISO-6603.

When measuring the peak force, the impact velocity was 4.4 m/s, the total weight was 60 kg, and the drop height was 987.085 mm.

In the aramid fabric/thermoplastic polyurethane composite prepared in Example 2, the tensile strength and tensile elastic modulus were significantly improved over the aramid fabric/thermoplastic polyurethane resin composites prepared in Comparative Examples 4 and 7, and the peak force exhibiting impact resistance was significantly improved over the carbon fiber fabric/thermoplastic polyurethane resin composites prepared in Comparative Example 5 and the carbon fiber fabric/thermosetting polyurethane resin composites prepared in Comparative Example 6.

In the aramid fabric/thermoplastic polyurethane resin composite prepared in Comparative Example 4, since the aramid fabric was a plain weave, not a basket weave, the tensile strength and tensile elastic modulus were significantly lower than those of the aramid fabric/thermoplastic polyurethane resin composite prepared in Example 2.

In the aramid fabric/thermoplastic polyurethane resin composite prepared in Comparative Example 7, since the aramid fabric was not treated with a sizing agent which is an aqueous polyurethane resin, the tensile strength and tensile elastic modulus were significantly lower than those of the aramid fabric/thermoplastic polyurethane resin composite prepared in Example 2.

In the carbon fiber fabric/thermoplastic polyurethane resin prepared in Comparative Example 5, the peak force showing impact resistance was significantly lower than that of the aramid fabric/thermoplastic polyurethane resin composite prepared in Example 2.

In the carbon fiber fabric/thermosetting epoxy resin composite prepared in Comparative Example 6, the peak force showing impact resistance was significantly lower than that of the aramid fabric/thermoplastic polyurethane resin composite prepared in Example 2, and due to the use of the thermosetting epoxy resin, the peak force exhibiting impact resistance was poorer than that of the carbon fiber fabric/thermoplastic polyurethane resin composite prepared in Comparative Example 2.

In the present disclosure, the content (wt %) of the aqueous polyurethane resin attached to and impregnated in the aramid fabric was measured by the following method.

First, 2.5 g of an aramid fabric (hereinafter referred to as "sample") in which the organic solvent and water in the sizing agent components were volatilized and only the aqueous polyurethane resin was attached to and impregnated in the surface and inside of the fabric was prepared. Next, the sample was placed in a syringe-shaped cylindrical tube, and then about 8 ml of methanol was added so that the sample was sufficiently wet, and a pressure was repeatedly applied to the tube until the solvent was no longer released.

Next, after the procedures of adding about 8 ml of methanol again to the tube and repeatedly applying a pressure to the tube until the solvent was no longer released were repeated twice, a sample was taken out of the tube, dried at 110° C., and the weight (W0) of the aramid fabric in which the polyurethane resin was not adhered to or impregnated onto the surface or inside there was measured.

Next, the weight of the aramid fabric (W1: sample weight) in which only the aqueous polyurethane resin in the sizing agent components was attached to and impregnated into the surface and inside of the fabric and the weight of the aramid fabric (WO) in which the aqueous polyurethane resin was not attached to and impregnated into the surface and inside of the fabric were substituted into the following formula to determine the content (W) of the aqueous polyurethane resin attached to and impregnated into the surface and inside of the aramid fabric.

$$W = \left(\frac{W1 - W0}{W1}\right) \times 100 \quad \text{[Formula]}$$

INDUSTRIAL APPLICABILITY

The aramid fabric of the present disclosure has excellent impact resistance and adhesion to a thermoplastic polyurethane resin, and thus is useful as a material for producing an aramid fabric/thermoplastic polyurethane resin composite.

The aramid fabric/thermoplastic polyurethane resin composite of the present disclosure is useful as an automobile part material such as an automobile bumper, or an electronic part material, which requires impact resistance.

The invention claimed is:

1. A method for producing an aramid fabric having excellent adhesion to a polyurethane matrix resin and excellent tensile strength, the method comprising:
   (i) a weaving step of weaving a 2×2 basket weave aramid fabric by using aramid yarns as warp and weft yarns; and
   (ii) a sizing treatment step of dipping the woven aramid fabric in a sizing agent solution composed of an aqueous polyurethane resin as a sizing agent and water, followed by squeezing and drying, thereby attaching and impregnating the sizing agent solution to the aramid fabric, wherein the content of the aqueous polyurethane resin attached to and impregnated into the surface and the inside of the aramid fabric is adjusted to 1 to 8% by weight, based on the sum total of the weight of the aqueous polyurethane resin attached to and impregnated into the surface and the inside of the aramid fabric and the weight of the aramid fabric before the aqueous polyurethane resin is attached and impregnated,
   wherein the weight ratio between the aqueous polyurethane resin which is a sizing agent constituting the sizing agent solution, and water which is a sizing agent constituting the sizing, agent solution, is 1.8 to 2.2:1.

2. The method for producing an aramid fabric having excellent adhesion to a polyurethane matrix resin and excellent tensile strength according to claim 1, wherein the content of the aqueous polyurethane resin attached to and impregnated into the surface and the inside of the aramid fabric is adjusted to 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated.

3. The method for producing an aramid fabric having excellent adhesion to a polyurethane matrix resin and excellent tensile strength according to claim 1, wherein the aramid fabric dip-treated in the sizing agent solution in the sizing treatment step is squeezed at a pressure of 1 to 2 kgf/cm².

4. The method for producing an aramid fabric having excellent adhesion to a polyurethane matrix resin and excellent tensile strength according to claim 1, wherein the aramid fabric squeezed in the sizing treatment step is dried at a temperature of 110 to 130° C. for 3 to 5 minutes.

5. The method for producing an aramid fabric having excellent adhesion to a polyurethane matrix resin and excellent tensile strength according to claim 1, wherein the aramid yarns used as warp and weft yarns have fineness of 1000 to 3000 denier.

6. The method for producing an aramid fabric having excellent adhesion to a polyurethane matrix resin and excellent tensile strength according to claim 1, wherein the warp density and the weft density of the aramid fabric are 10 to 20 yarns/inch, respectively.

7. An aramid fabric having excellent adhesion to a polyurethane matrix resin and excellent tensile strength characterized in that
   the aramid fabric has a texture in which warp and weft yarns, which are aramid yarns, are woven in a 2×2 basket weave,
   an aqueous polyurethane resin is attached to and impregnated into the surface and the inside of the aramid fabric, and
   the content of the aqueous polyurethane resin attached to and impregnated into the surface and the inside of the aramid fabric is 1 to 8% by weight, based on the sum total of the weight of the aqueous polyurethane resin attached to and impregnated into the surface and the inside of the aramid fabric and the weight of the aramid fabric before the aqueous polyurethane resin is attached and impregnated,
   wherein tensile strength measured by the method of ASTM D 3039 is 19,000 to 21,000 N/5 cm.

8. The aramid fabric having excellent adhesion to a polyurethane matrix resin and excellent tensile strength according to claim 7, wherein the aramid yarns, which are warp and weft yarns, have fineness of 1000 to 3000 denier.

9. The aramid fabric having excellent adhesion to a polyurethane matrix resin and excellent tensile strength according to claim 7, wherein the warp density and the weft density of the aramid fabric are 10 to 20 yarns/inch, respectively.

10. The aramid fabric having excellent adhesion to a polyurethane matrix resin and excellent tensile strength according to claim 7, wherein the content of the aqueous polyurethane resin attached to and impregnated into the surface and the inside of the aramid fabric is 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated.

11. An aramid fabric prepreg comprising:
   (i) an aramid fabric which has a texture where warp and weft yarns, which are aramid yarns, are woven in a 2×2 basket weave, and in which an aqueous polyurethane resin as a sizing agent is attached to and impregnated into the surface and inside of the fabric; and (ii) a polyurethane matrix resin which is impregnated in the aramid fabric and is in an uncured or semi-cured state, wherein the content of the aqueous polyurethane resin attached to and impregnated into the surface and the inside of the aramid fabric is 1 to 8% by weight, based on the sum total of the weight of the aqueous polyurethane resin attached to and impregnated into the surface and the inside of the aramid fabric and the weight of the aramid fabric before the aqueous polyurethane resin is attached and impregnated, wherein tensile strength of the of aramid fabric measured by the method of ASTM D 3039 is 19,000 to 21,000 N/5 cm.

12. An aramid fabric/thermoplastic polyurethane resin composite comprising:

(i) two or more aramid fabrics which have a structure where warp and weft yarns, which are aramid yarns, are woven in a 2×2 basket weave, and in which an aqueous polyurethane resin is attached to and impregnated into the surface and inside of the fabric; and (ii) a polyurethane matrix resin which is impregnated within the aramid fabric and between the aramid fabrics, wherein the content of the aqueous polyurethane resin attached and impregnated on the surface and the inside of the aramid fabric is 1 to 8% by weight based on the sum total of the weight of the aqueous polyurethane resin attached and impregnated on the surface and the inside of the aramid fabric and the weight of the aramid fabric before the aqueous polyurethane resin is attached and impregnated, and wherein a peak force measured by the method of ISO-6603 is 18,000 N or more, wherein the composite has tensile strength of 600 MPa or more and a tensile elastic modulus of 25 or more as measured by the method of ASTM D 3039.

13. The aramid fabric/thermoplastic polyurethane resin composite according to claim 12, wherein the composite has a thickness of 2.0 to 2.2 mm and the content of the thermoplastic polyurethane matrix resin is 30 to 45% by weight.

14. The aramid fabric/thermoplastic polyurethane resin composite according to claim 12, wherein the aramid yarns, which are warp and weft yarns, have fineness of 1000 to 7000 denier.

15. The aramid fabric/thermoplastic polyurethane resin composite according to claim 12, wherein the warp density and the weft density of the aramid fabric are 10 to 20 yarns/inch, respectively.

16. The aramid fabric/thermoplastic polyurethane resin composite according to claim 12, wherein the content of the aqueous polyurethane resin attached to and impregnated into the surface and the inside of the aramid fabric is 2 to 6% by weight, based on the sum total of the weight of the aqueous polyurethane resin attached to and impregnated into the surface and the inside of the aramid fabric and the weight of the aramid fabric before the aqueous polyurethane resin is attached and impregnated.

* * * * *